United States Patent [19]

Szego

[11] Patent Number: 4,974,413
[45] Date of Patent: Dec. 4, 1990

[54] RECUPERATIVE HEAT EXCHANGER

[76] Inventor: Peter F. Szego, 6644 Edmonton Ave., San Diego, Calif. 92122

[21] Appl. No.: 392,549

[22] Filed: Aug. 11, 1989

[51] Int. Cl.⁵ .............................................. F02C 7/08
[52] U.S. Cl. ................................. 60/39.511; 165/166
[58] Field of Search ....................... 60/39.511; 165/166

[56] References Cited

U.S. PATENT DOCUMENTS

| | | |
|---|---|---|
| 1,874,054 | 8/1932 | Levinsen . |
| 2,539,870 | 1/1951 | Simpelaar . |
| 3,507,115 | 4/1970 | Wisoka ............................. 60/39.511 |
| 3,877,519 | 4/1975 | Tramuta ....................... 60/39.511 X |
| 3,931,854 | 1/1976 | Ivakhnenko ......................... 165/166 |
| 4,301,649 | 11/1981 | Walker ......................... 60/39.511 X |
| 4,470,453 | 9/1984 | Laughlin ............................. 165/166 |

FOREIGN PATENT DOCUMENTS

| | | |
|---|---|---|
| 74716 | 9/1952 | Denmark . |
| 0173774 | 3/1986 | European Pat. Off. ......... 60/39.511 |
| 2839206 | 3/1980 | Fed. Rep. of Germany . |
| 769294 | 10/1980 | U.S.S.R. . |
| 694523 | 7/1953 | United Kingdom . |
| 1259832 | 1/1972 | United Kingdom . |

Primary Examiner—Robert G. Nilson
Attorney, Agent, or Firm—Baker, Maxham, Jester & Meador

[57] ABSTRACT

A heat exchanger for high velocity fluids comprises a first conduit through which a first fluid flows at a high velocity, a second conduit in heat exchange relationship with the first conduit for conducting a second fluid at a high velocity to be heated by the first fluid in the first conduit, the first and second conduits having a common thermally conductive wall, the common thermally conductive wall having a shape to impose a centrifugal force on the first and the second fluids flowing through the respective conduits.

16 Claims, 2 Drawing Sheets

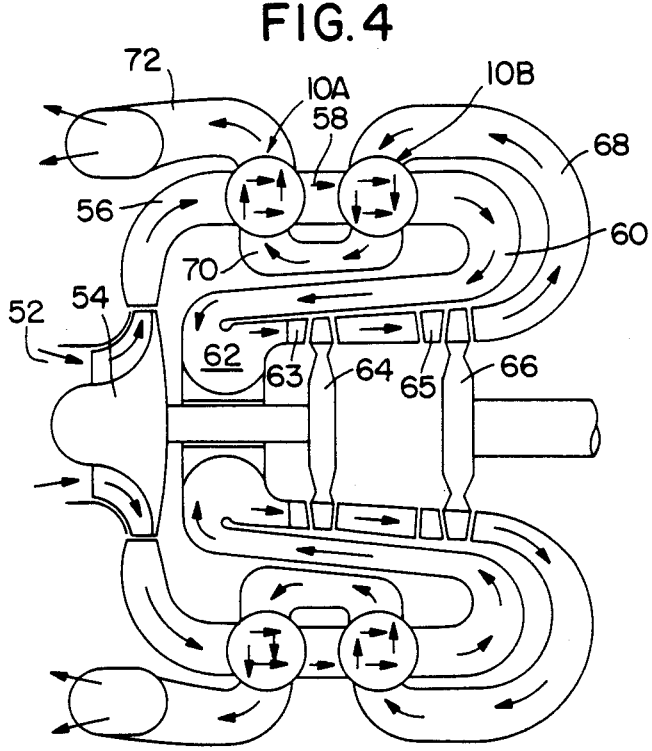
FIG. 4
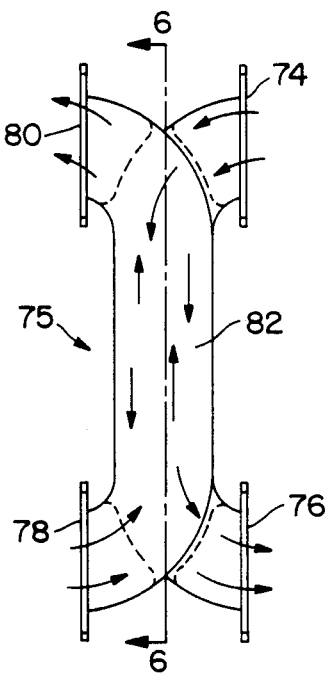
FIG. 5
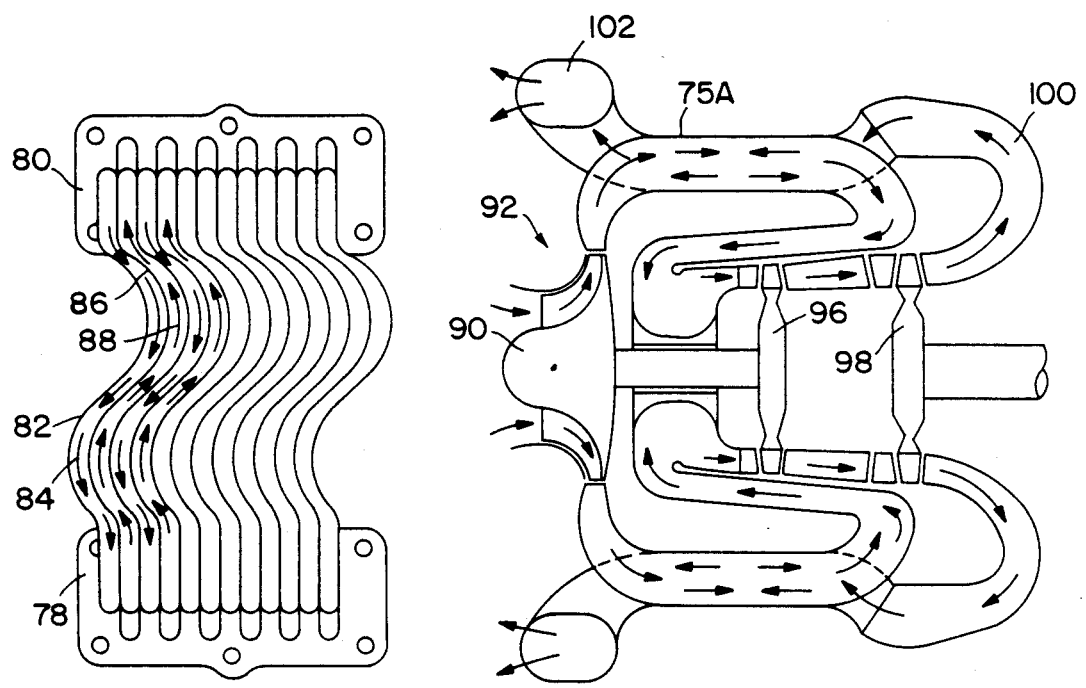
FIG. 6
FIG. 7

RECUPERATIVE HEAT EXCHANGER

BACKGROUND OF THE INVENTION

The present invention relates to heat exchangers and pertains particularly to heat exchangers for gas turbine engines and the like.

In the last thirty years, numerous efforts have been made to resolve the problems of heat exchangers for vehicular gas turbines. About forty years ago, Rover Company in England used gas turbines to propel passenger automobiles. During that period, aviation gas turbines, from jet engines to turbo fans, achieved unprecedented reliability and performance records and established the "Jet Era", which is still unmatched by any other type of transportation.

Gas turbine research programs and several experimental engines proved that for many industrial, vehicular, marine and off-highway applications that gas turbine is a more attractive prime mover than the Diesel engine. Many experimental applications showed that the recuperative gas turbine is the most fuel effective power plant available, and its development is important because of our growing energy requirements.

There are strong reasons why vehicular gas turbines, which worked with reasonable reliability and durability, were built by aircraft engine manufacturers or aerospace firms. However, the cost of manufacturing was so high that, due to competition with the Diesel and spark ignition engines, they could not be marketed.

Automotive or truck engine manufacturers also tackled the problem. However, their low cost technology was more suited to the mass production of Diesel and spark ignition engines, than to the more sophisticated manufacturing requirements of the gas turbine. In addition, their lack of expertise in gas turbine engineering was also an important factor in failure to produce a reliable engine.

In all cases, the most significant problem area seemed to be the heat exchanger. All of them were designed with very small hydraulic diameters, and fluids that passed through the heat exchanger had to be very large to make up for the "adequate" effectiveness.

The recuperative heat exchangers, if they are built with the current "state of art" using plate-fin or fixed boundary metallic recuperators, are too large and do not permit vehicular installation within the available engine envelope. They are all built with small hydraulic diameters (i.e. cross sectional flow areas), and have the tendency to cause high pressure drop and plug up with exhaust emission materials. This static recuperative heat exchanger is a very primitive structure and is not capable of handling high velocity fluids, the high pressure compressor discharge air, and the high temperature exhaust gas carrying combustion by-products.

Periodical (rotary) heat exchangers or regenerators show high thermal efficiency at small size, but present serious mechanical problems at the seals. Either the leakage rate is too high or the rubbing seals do not last long enough. Lubrication is impractical because of high temperature (1400 to 1800 degrees F.), and the cyclic radial and axial deflections of the rotating discs present unresolvable engineering problems. The periodical heat exchanger is really a heat storing device invented fifty years ago for air preheating of steam engine plants. Its inherent design characteristics cannot handle high pressure and high temperature fluids.

Because of these factors, virtually all vehicular gas turbine manufacturing efforts have comprised of endless development programs, which to date private industry cannot afford to support and finance.

It is therefore desirable that improved heat exchangers for high velocity gases be available.

SUMMARY AND OBJECTS OF THE INVENTION

It is a primary object of the present invention to provide an improved heat exchanger for high velocity fluids.

In accordance with a primary aspect of the present invention, a heat exchanger for high velocity fluids comprises a first conduit through which a first fluid flows at a high velocity, a second conduit in heat exchange relationship with said first conduit for conducting a second fluid at a high velocity to be heated by said first fluid in said first conduit, said first and second conduits having a common thermally conductive wall, said common thermally conductive wall having a shape to impose a centrifugal force on said first and said second fluids flowing through said respective conduits.

BRIEF DESCRIPTION OF THE DRAWING

The above and other objects and advantages of the present invention will become apparent from the following specification when read in conjunction with the accompanying drawings wherein:

FIG. 4 is a top plan view showing the embodiment of FIG. 1;

FIG. 5 is like FIG. 1 of an alternate embodiment;

FIG. 6 is a sectional view taken on line 6—6 of FIG. 5;

FIG. 7 is a view like FIG. 4 of the embodiment FIG. 5;

DETAILED DESCRIPTION OF A PREFERRED EMBODIMENT

One of the most important features of this novel heat exchanger of the present invention is that of the practical application of recently proven theoretical and experimental heat transfer science. Consequently, flow passage geometry in accordance with the invention is based on the practical application of the principles of "Forced Convection Heat Transfer", augmented by buoyancy effects of the fluid particles under the influence of centrifugal forces. The centrifugal forces are generated by the spheroid passages in the crossflow configuration, and by the curved passages in the counterflow configuration. The centrifugal forces impose a force normal to the passage walls and substantially eliminate boundary layer. Boundary layer is a term for the substantially stationary layer of fluid that lies along the surface of the passages, and separates the high velocity flow of gas from the walls of the passage under laminar flow conditions, as described at pages 1–5 and 6 in HANDBOOK OF HEAT TRANSFER, edited by Warren M. Roshenow and James P. Hartnet, Published and Copyright, 1973 by McGraw Hill, Inc., and incorporated herein by reference. The relatively large hydraulic diameter passages stacked on top of each other cause the cold and hot fluids to cross or counterflow each other. In this process, the compressor discharge air is heated and the exhaust gas is cooled.

The heat exchanger construction in accordance with the invention provides a great deal of flexibility for a design, which can result in a minimum pressure drop in the passages controlled by the cone angle of the spheroids or by the radius of the curved passages. It also provides a system with a much higher heat transfer effectiveness than contemporary designs. Consequently, a substantially smaller recuperator than before can be built.

The primary feature of the invention is that it is easily adaptable to any pressure ratio gas turbine, because the flexible passage geometry, which controls the centrifugal force, and consequently the pressure drop of the compressor discharge air.

Another important feature of the invention is that it has passages with relatively large hydraulic diameters, where high fluid velocities will prevent plug up with exhaust emission materials. Consequently, low maintenance and high reliability are achieved.

Figure 1:
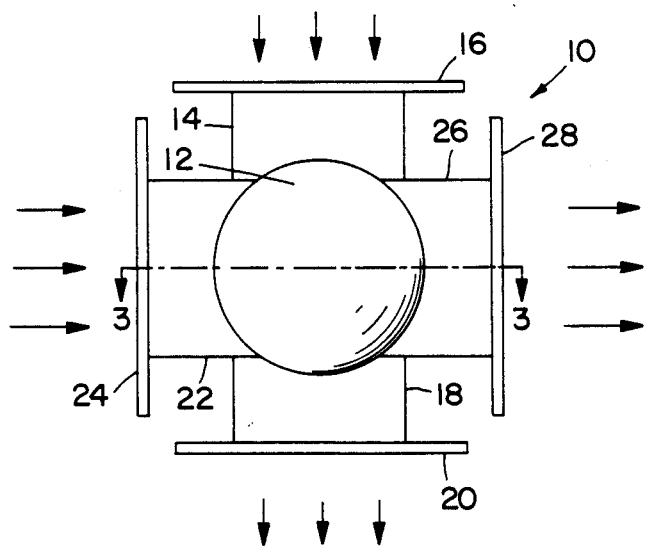
FIG. 1 is a top plan view of an exemplary embodiment of the invention.
Figure 2:
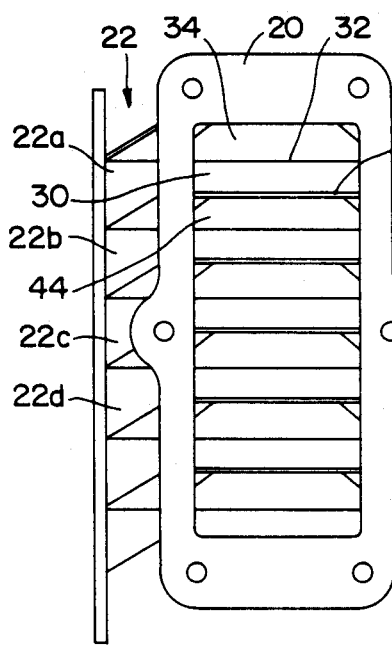
FIG. 2 is a side elevation view of the embodiment of FIG. 1.
Figure 3:
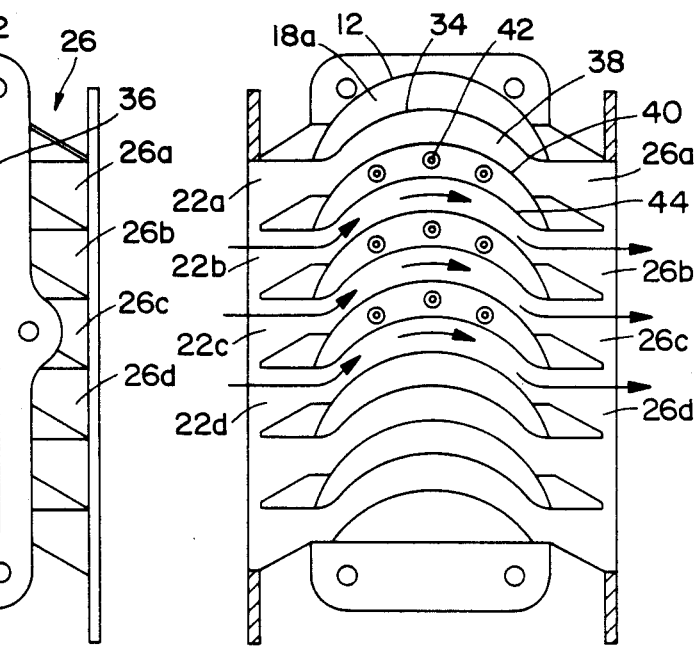
FIG. 3 is a view, in section, taken generally on lines 3—3 of FIG. 1.

Referring to FIGS. 1-3, an exemplary embodiment of a compact crossflow unit is illustrated and designated generally by the numeral 10. The unit comprises a plurality of curved chambers, defined by a plurality of identical stacked partition members or cloisons forming common upper and lower walls of a plurality of cross channels. Each partition member (hereinafter referred to as a dome) comprises a central bi-directionally curved portion identical to a top member dome, which is illustrated as a spheroidal contour, but may be of any such bi-directionally curved contour, for example, an ovoid. Each dome member cooperates with an adjacent dome member to form a curved chamber or passage, which is formed with two diametrically opposed openings, adjacent its lower peripheral edge. A plurality of the stacked curved chambers communicate via opposed passages, with common flanged inlet and outlet ducts. A duct extends outwardly from each opening to the faces of the respective flanges.

Referring to FIG. 1 of the drawings, a top view on the unit is illustrated as having a vertical series of six inlet ducts, designated generally by the numeral 14, with a flange 16 for connection to a first source of a gas with a series of six outlet ducts, designated generally at 18, and corresponding flange 20 for connecting to a suitable engine intake or the like to which the gas will be supplied. A crossflow duct system includes a series of six ducts 22, generally, with an inlet flange 24 for connecting to a source of hot fluid, such as exhaust gases or the like with a series of six outlet ducts 26, generally, and corresponding flange 28 for connecting to the exhaust outlet. These ducts 14, 18, 22, and 26 form through passages through adjacent curved chambers, and communicate with a plurality of like ducts and chambers vertically stacked and communicating with the common flanges 16, 20, 24 and 28. An exemplary direction of flow is indicated by the arrows. The exchanger is formed of a symmetrical arrangement of ducts, and common walls which are symmetric relative to a center line or axis of flow thereof, and the flow direction can be reversed. The ducts are formed with rather large hydraulic diameters that are also substantially uniform in cross-sectional areas. The term large hydraulic diameter is a term of art and generally means large enough for substantially unrestricted flow. In the gas turbine art, for example, a large hydraulic diameter passage would be such as to handle substantially the entire flow through a nozzle as illustrated in FIGS. 4 and 7. This provides an efficient high velocity flow of fluids. The passages are also formed to be aerodynamically efficient, i.e. without sharp bends, restrictions or reversal of direction.

Referring specifically to FIG. 2, there is illustrated a view looking directly into flange 20 and showing a side view of flanges 24 and 28, with ducts 22a and 26a extending from the flanges 24 and 28 inward to join with the common walls forming the cross passages. As seen in FIG. 2, looking into duct 18 at the very top of flange 20, shows upwardly sloped inner duct wall 30 extending upward to and joining at the base 32 of a dome 34 identical to but spaced downwardly from dome 12. The surface of dome 34 forms the lower wall of the passage between passages of ducts 14 and 18, and forms the upper wall of the next lower chamber and passage connected with ducts 22a and 26a extending from left to right in the view. Spaced directly above dome 34 is dome 12, which together therewith forms the curved passage through which the fluid passes from upper passage of duct 14 to 18. The lower wall of passage or duct 18 forms a common forward edge 36 with the upper inlet wall of the next lower duct.

Referring to FIG. 3, the curved passage between domes 12 and 34 is illustrated, with this passage curving both around the axis of flow, as well as along the axis of flow. As can be seen in FIG. 3, the upper wall of the inner passage is concave, formed by the dome 12 with the inner wall being convexed, formed by the upper surface of dome 34. The next lower passage between ducts 22a and 26a is of a similar or substantially identical configuration extending at 90 degrees there to, as shown in FIG. 3. In this embodiment, inlet passage of duct 22a communicates with a curved passage 38, formed between the lower surface of dome 34 and the upper surface of the next lower dome 40. The passages alternate at right angles to one another on opposite sides or surfaces of each dome.

The next lower passage 42 of the 14–18 duct in the unit extends in a direction common to that of the upper passages between ducts 14 and 18, and is formed by the lower surface of dome 40 and the upper surface of the next lower dome 44. The outlet to this passage 38 communicates with the outlet at flange 20 by means of a dome formed by sloping wall 46, terminating at a common edge 48 with the next lower duct. Each dome forms both the bottom wall of one duct and the upper wall of the next lower duct, and a common heat transfer wall between a hot passage and a cold passage.

The remaining ducts and passages in the apparatus are of a similar configuration, extending alternately across one another and each with a central compound curvature as in the previously described passages. This provides a construction wherein high velocity fluids flowing through the exchanger, particularly gases and the like, are forced against the curved walls, creating high surface pressures that effectively eliminate the majority of boundary layer at the surface. The high pressure at the surface effects the elimination of boundary layer and considerably increases the heat conductivity between the wall surfaces and the gas or fluid flowing thereon. This provides a more highly efficient heat transfer between the fluids in the adjacent passages than presently known heat exchangers. With this arrangement, a more compact heat exchanger may be provides and utilized for turbine engines and the like, thereby making use of turbine engines in motor vehicles practical.

Referring to FIG. 4 of the drawing, there is illustrated an example of an engine incorporating an embodiment of the invention as just described. As illustrated in FIG. 4, a turbine engine, designate generally by numeral 15, has an intake 52 to a compressor 54, which compresses and conducts intake air via a conduit 56 to a first heat exchanger 10a and then via a conduit 58 to a second heat exchanger 10b downstream of the first heat exchanger, where the heated compressor discharge air passes via the intake duct 60 to the combustor 62, and then through nozzles 63 and 65 to the turbine wheels 64 and 66, and then to exhaust duct 68, where it then passed to the downstream heat exchanger 10b and then along a duct 70 to the first heat exchanger 10a, and thence to the exhaust outlet 72. This illustrates a use of two of the crossflow heat exchangers.

Referring to FIGS. 5 and 6 of the drawings, an alternate embodiment of a heat exchanger of the counterflow type is illustrated.

Referring to FIG. 5, there is illustrated an alternate embodiment of a heat exchanger in accordance with the invention. In the illustrated embodiment, a manifold 74 communicates by way of a plurality of passages to an outlet manifold 76. A similar inlet manifold 78 communicates by way of plurality of passages with an outlet manifold 80.

Referring to FIG. 6, which is a sectional view, through line 6—6 of FIG. 5 it will be seen that adjacent counterflow passages between the respective inlets and outlets of the manifolds share a common heat exchange wall. As illustrated in FIGS. 5 and 6, an outer wall 82 forms the outer wall of a passage 84 which communicates between manifold 78 and 80. This passage 84 shares a common wall 86 with the next adjacent passage 88, which communicates between common inlet and outlet manifolds 74 and 76. Thus, adjacent passages conduct fluids in opposite direction and share a common curved heat transfer wall. This common curved heat transfer wall, as well as the passages therealong are symmetric relative to a centerline or axis of flow as will be apparent from FIGS. 5, and 6. As illustrated in this embodiment, the fluid in flowing from one end to other encounters a curved wall having somewhat of a sinusoidal configuration.

It is desirable that the fluid in contact with the wall flows along the wall to enhance and improve the conductivity between the fluid and the wall. The curved wall creates a higher pressure as a result of the centrifugal force within the curved portion of the wall, resulting in a higher pressure forcing the flowing fluid within the passage by means of centrifugal force into contact with the outside curved wall. It has been found that a similar result is obtained along the surface of both the inner wall and the outer wall of the passage. Thus, the curved wall forcing the gas to undergo centrifugal force results in reduction or elimination of boundary layer, and a highly efficient heat transfer condition in the proper configured passages can maintain a substantial laminar flow.

It is desirable in this environment to maintain a non-turbulent flow for high flow efficiency, yet eliminate the boundary layer at the wall surface. The illustrated embodiment by virtue of its ability to induce centrifugal force in the flowing fluid is effective to substantially eliminate the boundary layer at the wall surface, and thereby induces a highly efficient heat transfer.

Referring to FIG. 7, a heat exchanger 75a, in accordance with this embodiment, is disposed downstream of an intake compressor 90 of a gas turbine engine 92. The intake air, after compression, is fed to a combustion chamber 94, where the combustion gases are then fed to turbines 96 and 98 and passes into the exhaust duct 100. The exhaust passage is in the opposite direction to that of the intake gases, thus transferring heat thereto as it flows along to the exhaust outlet 102.

The heat exchangers, in accordance with this invention as exemplified above, maybe used in any suitable heat exchange situation between two flowing fluids. The invention, as set forth herein, however is primarily developed for use in high velocity gas flow situations, such as would be utilized for turbines adapted for vehicular use or the like. Such applications are in an environment wherein space is a premium and efficiency is a necessity. The highly efficient and compact arrangement, as describe herein, makes the application of turbines to such vehicular applications feasible.

While I have illustrated and described my invention by means of specific embodiments, it is to be understood that numerous changes and modifications may be made therein without departing from the spirit of the scope of the invention as defined in the appended claims.

I claim:

1. A heat exchanger for high velocity fluids comprising:

a plurality of first conduits, each having an inlet and an outlet and a large hydraulic diameter of substantially uniform cross-sectional area through which a first fluid flows in a non-turbulent laminar flow at a high velocity;

a plurality of second conduits, each having an inlet and an outlet and a large hydraulic diameter of substantially uniform cross-sectional area, including said inlet and said outlet in heat exchange relationship with said first conduit for conducting a second fluid in a non-turbulent laminar flow at a high velocity to be heated by said first fluid in said first conduit;

a first common inlet and a first common outlet each having substantially the same cross-sectional area as and communicating with the inlets and the outlets respectively of said first plurality of conduits;

a second common inlet and a second common outlet each having substantially the same cross-sectional area as and communicating with the inlets and the outlets respectively of said plurality of second conduits; and said first and second conduits having a common thermally conductive wall, said common thermally conductive wall having a symmetric and curved shape along said first and said second conduits to impose a centrifugal force on said first and said second fluids flowing through said respective conduits for substantially eliminating boundary layer at said common wall while maintaining said non-turbulent laminar flow.

2. A heat exchanger for high velocity fluids according to claim 1, wherein:

said first and said second fluids are compressible.

3. A heat exchanger for high velocity fluids according to claim 2 wherein:

said first and said second fluid conduits are in counterflow relation to one another; and said common wall has a sinusoidal configuration.

4. A heat exchanger for high velocity fluids according to claim 2 wherein:
said first conduit is open to a common inlet with a plurality of parallel disposed like first conduits, and is open to a common outlet with said like conduits; and
said second conduit is open to a common inlet with a plurality of parallel disposed like second conduits, and is open to a common outlet with said like conduits.

5. A heat exchanger for high velocity fluids according to claim 4 wherein:
said first and said second fluid conduits are in counterflow relation to one another; and
said common wall has a sinusoidal configuration.

6. A heat exchanger for high velocity fluids according to claim 1 wherein:
said first and said second fluid conduits are in counterflow relation to one another; and
said common wall has a sinusoidal configuration.

7. A heat exchanger for high velocity fluids comprising:
a plurality of first conduits, each having an inlet and an outlet and through which a first compressible fluid flows at a high velocity;
a plurality of second conduits, each having an inlet and an outlet and in heat exchange relationship with said first conduit for conducting a second compressible fluid at a high velocity to be heated by said first fluid in said first conduit;
a first common inlet and a first common outlet each having substantially the same cross-sectional area as and communicating with the inlets and the outlets of said first plurality of conduits;
a second common inlet and a second common outlet each having substantially the same cross-sectional area as and communicating with the inlets and the outlets of said plurality of second conduits;
said first and said second fluid conduits are in crossflow relation to one another and have a common thermally conductive wall; and
said common thermally conductive wall has a dome shape for imposing a centrifugal force on said first and said second fluids flowing through said respective conduits for substantially eliminating boundary layer between said fluids and said common wall.

8. A heat exchanger for high velocity fluids comprising:
a plurality of parallel disposed like first conduits through which a first compressible fluid flows at a high velocity, said first conduits have a cross-sectional area equal to, and open to a common inlet with said like conduits;
a plurality of parallel disposed like second conduits in heat exchange relationship with said first conduits for conducting a second compressible fluid at a high velocity to be heated by said first fluid in said first conduit, said second conduits being open to a common inlet with a plurality of parallel disposed like second conduits, and open to a common outlet with said like conduits;
said first and said second fluid conduits are separated by a plurality of common thermally conductive walls and are in crossflow relation to one another; and
said common walls are symmetrical along said passages and have a spheroidal contour to impose a centrifugal force on said first and second fluids flowing through said respective conduits for substantially eliminating boundary layer on said common walls.

9. A heat exchanger for high velocity compressible fluids in an engine comprising:
a plurality of first conduits, each having an inlet and an outlet and a large hydraulic diameter with a substantially uniform cross-sectional area from said inlet to said outlet through which a first fluid flows in a non-turbulent laminar flow at a high velocity;
a plurality of second conduits, each having an inlet and an outlet and a large hydraulic diameter with a substantially uniform cross-sectional area between said inlet and said outlet in heat exchange relationship with said first conduit for conducting a second fluid in a non-turbulent laminar flow at a high velocity to be heated by said first fluid in said first conduit;
a first common inlet and a first common outlet each having substantially the same cross-sectional area as and communicating with the inlets and the outlets respectively of said first plurality of conduits;
a second common inlet and a second common outlet each having substantially the same cross-sectional area as and communicating with the inlets and the outlets respectively of said plurality of second conduits; and
said first and second conduits each having a longitudinal flow axis lying in a common plane and having a common thermally conductive wall that is symmetric with respect to said common plane, said wall having a curvature within said plane for imposing a centrifugal force on said first and said second fluids flowing through said respective conduits for substantially eliminating boundary layer at said wall while maintaining said non-turbulent laminar flow.

10. A heat exchanger for high velocity fluids according to claim 9 wherein:
said first conduit is open to a common inlet with a plurality of parallel disposed like first conduits, and is open to a common outlet with said like conduits; and
said second conduit is open to a common inlet with a plurality of parallel disposed like second conduits, and is open to a common outlet with said like conduits.

11. A heat exchanger for high velocity fluids according to claim 10 wherein:
said first and said second fluid conduits are in counterflow relation to one another; and
said common wall has a sinusoidal configuration.

12. A heat exchanger for high velocity compressible fluids in an engine comprising:
a plurality of first conduits, each having an inlet and an outlet and a substantially uniform cross-sectional area from said inlet to said outlet through which a first fluid flows in a non-turbulent laminar flow at a high velocity;
a plurality of second conduits, each having an inlet and an outlet and a substantially uniform cross-sectional area between said inlet and said outlet in heat exchange relationship with said first conduit for conducting a second fluid in a non-turbulent flow at a high velocity to be heated by said first fluid in said first conduit;

a first common inlet and a first common outlet each having substantially the same cross-sectional area as and communicating with the inlets and the outlets respectively of said first plurality of conduits;

a second common inlet and a second common outlet each having substantially the same cross-sectional area as and communicating with the inlets and the outlets respectively of said plurality of second conduits;

said first and second conduits each having a common thermally conductive wall, are in crossflow relation to one another; and said common wall has a spheroidal contour for imposing a centrifugal force on said first and said second fluids flowing through said respective conduits.

13. A recuperative heat exchanger for high velocity pre-combustion and exhaust gases of an engine comprising:

a plurality of first conduits, each having an inlet and an outlet and a large hydraulic diameter with a substantially uniform cross-sectional area from said inlet to said outlet for conducting exhaust gases from an engine in a non-turbulent laminar flow at a high velocity;

a plurality of second conduits, each having an inlet and an outlet and a large hydraulic diameter with a substantially uniform cross-sectional area between said inlet and said outlet in heat exchange relationship with said first conduit for conducting pre-combustion gases in a non-turbulent laminar flow at a high velocity to the intake of an engine;

a first common inlet and a first common outlet each having substantially the same cross-sectional area as and communicating with the inlets and the outlets respectively of said first plurality of conduits;

a second common inlet and a second common outlet each having substantially the same cross-sectional area as and communicating with the inlets and the outlets respectively of said plurality of second conduits; and said first and second conduits each having a common thermally conductive wall, said wall having a symmetric curved shape along said conduits for imposing a centrifugal force on said first and said second fluids flowing through said respective conduits for substantially eliminating boundary layer at said wall while maintaining said non-turbulent laminar flow.

14. A heat exchanger for high velocity fluids according to claim 13 wherein:

said first conduit is open to a common inlet with a plurality of parallel disposed like first conduits, and is open to a common outlet with said like conduits; and said second conduit is open to a common inlet with a plruiaty of parallel disposed like second conduits, and is open to a common outlet with said like conduits.

15. A heat exchanger for high velocity fluids according to claim 14 wherein:

said first and said second fluid conduits are in counterflow relation to one another; and said common wall has a sinusoidal configuration.

16. A recuperative heat exchanger for high velocity pre-combustion and exhaust gases of an engine comprising:

a plurality of first conduits, each having an inlet and an outlet and a substantially uniform cross-sectional area from said inlet to said outlet for conducting exhaust gases from an engine in a non-turbulent flow at a high velocity;

a plurality of second conduits, each having an inlet and an outlet and a substantially uniform cross-sectional area between said inlet and said outlet in heat exchange relationship with said first conduit for conducting pre-combustion gases in a non-turbulent flow at a high velocity to the intake of an engine;

said first and said second fluid conduits have a common thermally conductive wall and are in crossflow relation to one another;

a first common inlet and a first common outlet each having substantially the same cross-sectional area as and communicating with the inlets and the outlets respectively of said first plurality of conduits;

a second common inlet and a second common outlet each having substantially the same cross-sectional area as and communicating with the inlets and the outlets respectively of said plurality of second conduits; and said common wall has a spheroidal contour for imposing a centrifugal force on said first and said second fluids flowing through said respective conduits.

* * * * *